April 11, 1961  J. W. TILEY  2,979,444
ELECTROCHEMICAL METHOD AND APPARATUS THEREFOR
Filed July 16, 1957
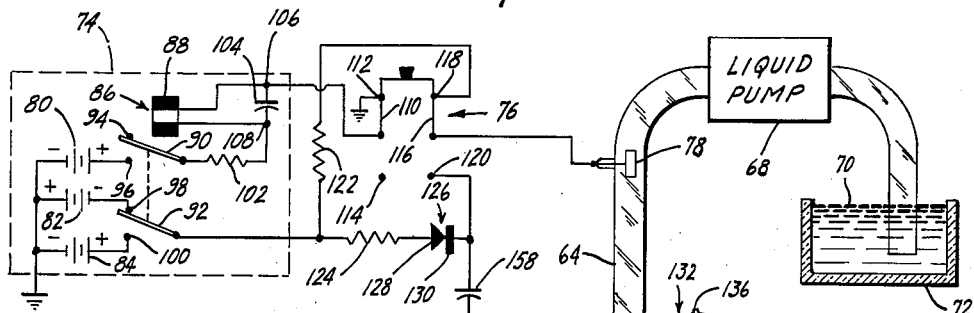
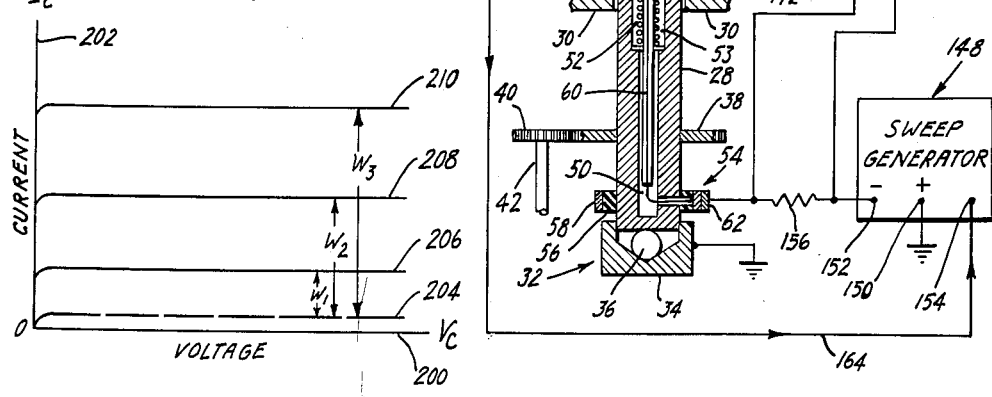
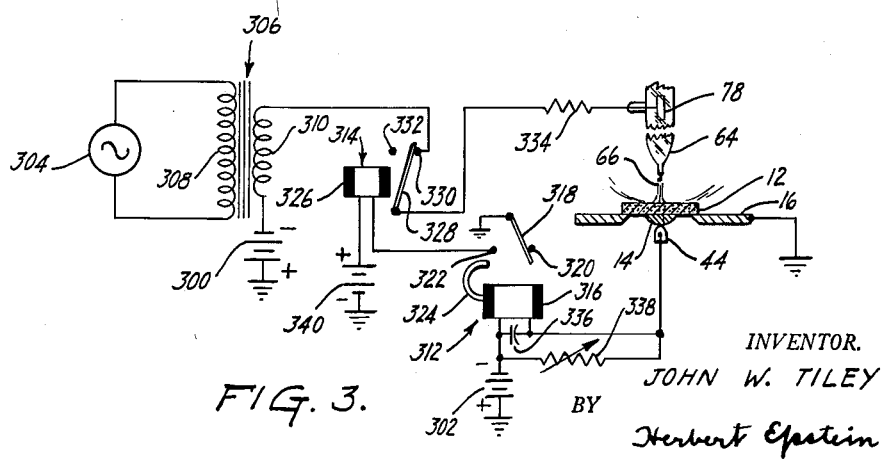
INVENTOR.
JOHN W. TILEY
BY
Herbert Epstein
AGENT

United States Patent Office 2,979,444
Patented Apr. 11, 1961

2,979,444

ELECTROCHEMICAL METHOD AND APPARATUS THEREFOR

John W. Tiley, Hatboro, Pa., assignor to Philco Corporation, Philadelphia, Pa., a corporation of Pennsylvania Filed July 16, 1957, Ser. No. 672,180

7 Claims. (Cl. 204—143)

This invention relates to an electrochemical method and to apparatus for its practice, and more particularly to a method and apparatus for producing regions of predetermined thicknesses in semiconductive bodies.

In the manufacture of transistors, it is exceedingly important in most instances that the base-width of the transistor be established at a predetermined value with a high degree of accuracy. In the specific instance where the transistors being manufactured are surface-barrier transistors, whose base-widths are determined by the thickness of semiconductive material separating emitter and collector contacts applied to opposing surfaces of the semiconductive body, the manufacturing problem becomes one of reducing the thickness of the semiconductive body to the predetermined base-width. By reason of the invention by J. W. Tiley and R. A. Williams of the jet electrolytic process for shaping semiconductive bodies, which invention is described and claimed in their copending application, Serial No. 472,824, filed December 3, 1954, entitled "Semiconductive Devices and Methods for the Fabrication Thereof," and assigned to the assignee of the present application, it is now possible by electrolytic etching to reduce the thickness of semiconductive bodies within accurately predetermined regions and with a considerable amount of control over the rate at which the thickness-reduction progresses.

As aforementioned it is important to be able to terminate the etching of a semiconductive body when its thickness has been reduced precisely to a predetermined value. To this end T. V. Sikina has provided an electro-optical method and apparatus, described and claimed in his copending patent application, Serial No. 424,704, now Patent No. 2,875,140, filed April 21, 1954, entitled "Method and Apparatus for Producing Semiconductive Structures," and assigned to the assignee of the present invention, for measuring the thickness of the semiconductive body during the time it is being electrolytically etched and for terminating automatically the etching when the thickness of the body has been reduced to the desired value. According to Sikina's method, polychromatic light, containing spectral components for which the transmittance of the semiconductive material differs for thicknesses in the vicinity of the desired value, is passed through the body region being etched. Because the dominant wavelength of the light transmitted through the body varies in response to variations in the thickness thereof, the occurrence of a predetermined change in the spectral distribution of this transmitted light is an indication that the desired thickness has been attained and that the etching process should be terminated.

According to another electro-optical thickness-measuring method invented by R. N. Noyce and described in his copending patent application, Serial No. 449,347, now Patent No. 2,875,141, filed August 12, 1954, entitled "Electrical Method and Apparatus," and assigned to the assignee of the present application, the thickness of the semiconductive body is monitored during etching by shining, upon a body region being etched, a light having components within a restricted band in the vicinity of a transmission limit of the body for the thickness to be determined. As the thickness of the material is altered, the transmission band edge of the body changes in wavelength and produces readily distinguishable changes in the intensities of components in the vicinity thereof. These changes serve as an accurate indication of the thickness of the semiconductive body during the course of etching and may be supplied to appropriate apparatus responsive thereto to terminate electrolytic etching when the thickness of the semiconductive body has been reduced to the desired value.

While both of these electro-optical methods provide accurate indications of the thickness of the body region undergoing etching after the thickness of the body has been reduced below a relatively small value, they are less accurate or even unusable for body thicknesses for which most of the light applied to the body is absorbed therewithin and only a small amount of light emerges from the surface opposing that on which the light impinges. Moreover these optical methods cannot be used to determine the thickness of semiconductive material remaining between a rectifying barrier positioned substantially below the surface of the semiconductive body and a body surface opposing this barrier, or where a metallic surface-barrier contact was affixed to a body surface opposing the surface region to be etched, prior to the etching of the latter surface region. To make the thickness measurement under the foregoing conditions and while said opposing surface region undergoes etching, W. E. Bradley and J. Roschen have invented the punch-through measurement method, described and claimed in patent application Serial No. 575,159, filed March 30, 1956, entitled "Electrochemical Method and Apparatus," and also assigned to the assignee of the present application. However the punch-through method, which depends upon the ascertainment of that critical back-biasing voltage which must be applied to a rectifying barrier to produce within the semiconductive body a depletion zone extending from the barrier to the opposing surface of the body, is also limited with respect to the range of thicknesses which it can measure. Specifically the punch-through measurement technique can be used only for that range of thicknesses for which the value of the back-biasing voltage necessary to cause punch-through is less than the voltage producing either avalanche or Zener breakdown within the semiconductive body.

From the foregoing it is apparent that all of the above-described methods of the prior art, which measure the thicknesses of semiconductive bodies while these bodies undergo etching, are limited as to the maximum thickness which they can measure. Nonetheless it is frequently desirable in practice to be able to measure the thicknesses of semiconductive bodies undergoing etching even while the etched portion of the body is relatively thick. Moreover, in transistors intended to amplify low-frequency alternating currents at relatively high power levels, it is necessary that the base-width of the transistors be relatively thick, thereby to permit dissipation of subtsantial amounts of power without an excessive rise in the temperature of the transistor. In order that it be possible to mass-produce such thick-based transistors with a high degree of accuracy, it is necessary that these thick base-widths be accurately measurable during the etching of the semiconductive body.

Accordingly it is an object of the invention to provide an improved electrochemical method for producing a region of predetermined thickness in a semiconductive body.

Another object is to provide an improved electrochemical method for measuring the thickness of a semiconductive body while its thickness is being reduced.

A further object is to provide an electrochemical method for measuring the thickness of a relatively thick semiconductive body while its thickness is being reduced by etching.

Still another object is to provide an improved electrochemical method of automatically terminating the electrolytic etching of a semiconductive body when its thickness has been reduced to a predetermined value.

A further object is to provide an improved electrochemical method for measuring accurately the distance between a rectifying barrier located within a semiconductive body and a surface of said body opposing said barrier and undergoing electrolytic etching.

Yet another object is to provide an improved electrochemical method and apparatus for automatically terminating the electrolytic etching of the surface of a semiconductive body having a rectifier contact affixed to a surface of said body opposing the etched surface and providing electrical connection to a rectifying barrier within the body, when the distance between the barrier and etched surface is reduced to a predetermined value.

A still further object is to provide an improved electrochemical method and apparatus for measuring the thickness of a semiconductive body during jet electrolytic etching thereof, which method is simple to perform and is therefore adapted to mass production of transistors.

An additional object is to provide an electrochemical method and apparatus which is particularly suitable for use in fabricating transistors having relatively thick bases.

In accordance with my invention, an indication of the thickness of a semiconductive body region lying between a surface defined by a first rectifying barrier located within the body and an exposed body surface opposing the rectifying barrier, during the course of reducing the body thickness by etching of the exposed surface, is derived by injecting minority carriers into one of these surfaces and by detecting the number of the injected carriers which reach the other surface. Because the number of minority carriers reaching the latter surface depends strongly upon the distance separating the surfaces, this number provides an accurate measure of the above-defined thickness.

More specifically, in one form of the method of my invention, an indication of the aforementioned thickness is derived by applying to the aforesaid opposing surface electrically-conductive etching means which provide a second rectifying barrier therein and are operative to effect etching progressively in the direction of the first barrier. In addition, one of the two rectifying barriers is supplied with an input current which, at given times, has a predetermined intensity and a sense such as to bias the latter barrier in the direction of easy conduction so that minority carriers are injected into the semiconductive body by this barrier, while the other barrier is biased in the direction to attract minority carriers thereby to serve as a collector of those injected minority carriers which diffuse into the vicinity thereof. As an important feature of the invention, a signal is derived from the latter barrier which is indicative of the intensity of an electric current flowing through this barrier at the aforementioned given times and in response to the aforementioned input current. As the thickness of the semiconductive body is progressively reduced through the operation of the etching means, the intensity of the signal produced in response to this input current increases in a determinable manner. Accordingly this signal provides an accurate measure of the thickness of the semiconductive body.

In still more specific aspects of the method of my invention, the step of applying electrically-conductive etching means may comprise the step of directing a jet of an electrically-conductive solution against the surface of the semiconductive body opposing the first rectifying barrier. Moreover the first rectifying barrier may itself be established by applying a surface-barrier electrode to the body surface opposing that impinged by the jet, or alternatively connection may be made to a barrier located a substantial distance within the semiconductive body, e.g. an alloy-junction, by means of a rectifier contact affixed to the body. As a still further alternative, the first rectifying barrier may be established by directing a second jet of an electrically conductive solution against the surface opposing that impinged by the first jet.

In addition the step of supplying the aforesaid input current may include the step of applying to the electrolytic jet, during a first group of time-spaced intervals, a current having a sense such that electrolytic etching of the semiconductive body takes place, and applying, during a second group of time-spaced intervals intermediate the intervals of the first group, a current of predetermined intensity having a sense such as to cause minority-carrier injection into the semiconductive body by the rectifying contact existing in the region of contact of the jet and the body. In such a case the step of deriving an output signal may include the step of ascertaining the intensity of the current flowing through the barrier opposing that established by the jet, during the second group of time intervals, i.e. when minority carrier injection is produced.

In an important specific embodiment of my novel method, wherein the semiconductive body to be etched is constituted of n-type semiconductive material, the electrically-conductive solution applied as a jet to the body surface to be etched comprises ions of a metal which, when applied to the semiconductive body, forms a surface-barrier therein. To effect electrolytic etching, a current establishing the jet at a potential negative with respect to that of the body is supplied to the jet, while to facilitate this etching a light may be shined on the body region undergoing etching. Moreover, to measure the thickness of the semiconductive body, a current of predetermined intensity and of sense opposite to that of the first-mentioned current is supplied to the jet. In addition a back-biasing potential is applied to a rectifier contact located on the surface of the semiconductive body opposing the surface undergoing etching. Under these conditions and during the times when the measuring current is supplied, there is electrodeposited on the surface undergoing etching a thin layer of said surface-barrier-forming metal, which upon deposition serves to inject holes into the semiconductive body. As discussed hereinbefore those injected holes diffusing into the vicinity of the back-biased rectifying barrier are collected thereby, and the hole current thus established therethrough provides a measure of the thickness of the semiconductive body.

According to the invention in still another aspect, apparatus is provided for deriving an indication of the thickness of the region of a semiconductive body lying between a surface defined by a rectifying barrier located within the body and an exposed surface thereof opposing the barrier, during the course of reducing the thickness of the body by etching the exposed surface. In essence this apparatus includes means for applying to the exposed body surface an electrically-conductive etchant, means for injecting a current of minority carriers into one of the above-defined surfaces during the application of the etchant, and means for detecting the proportion of this current of injected carriers which reaches the other of the above-defined surfaces. In one preferred embodiment, these detecting means comprise oscilloscopic means for displaying the intensity of the current of minority carriers reaching said other surface, thereby to provide a visual indication representative of the above-defined thickness. In a second preferred embodiment these detecting means include apparatus responsive to the current of minority carriers reaching said other surface for terminating the etching of the body when the aforementioned proportion of carriers exceeds a predetermined value indicative of the fact that the body has been etched to the desired thickness.

Other advantages and features of the invention will become apparent from a consideration of the following detailed description, taken in connection with the accompanying drawings, in which:

Figure 1 illustrates diagrammatically a novel apparatus suitable for use in practicing the method of the invention;

Figure 2 is a graphical representation explanatory of the operation of the apparatus of Fig. 1; and Figure 3 is a schematic diagram of another apparatus suitable for practicing the method of the invention.

Considering my invention in greater detail, there will first be described an embodiment of my method and apparatus which is particularly well adapted to produce jet electrolytic etching of an n-type semiconductive body and contemporaneously to produce visible indications of the thickness of semiconductive material separating the body surface impinged by the jet from a rectifying barrier located either within the body or at an opposing surface thereof. In this arrangement a timing circuit is provided which alternately supplies to the jet an etching current and a substantially constant hole-injecting current. In addition, during each hole-injection period the reverse-biased current-voltage characteristic of the rectifying barrier is oscilloscopically displayed. Since the current flowing through the rectifying barrier depends upon the number of holes reaching it, and since this number is in turn a function of the thickness of the body region lying between the barrier and the surface impinged by the jet, the displayed current-voltage characteristic provides a direct indication of the latter thickness.

Subsequently there will be described a second embodiment of my method and apparatus in which electrolytic etching is automatically terminated when the body has been etched to the desired thickness.

Referring now to Fig. 1 of the drawings, which depicts diagrammatically an arrangement suitable for practicing a preferred form of my method, there is illustrated a semiconductor structure 10 comprising a semiconductive body 12 which, in the specific arrangement here described, is composed of n-type germanium. Affixed to body 12 is a rectifier contact 14, which in one instance may be a surface-barrier electrode and in another instance may be a metallic contact affording a low-resistance connection to a rectifying barrier located within the semiconductive body. Also affixed to semiconductive body 12, by means of a solder having ohmic properties, is a so-called window-frame base tab 16, shown in cross-section in the drawing. Base tab 16, which may be composed of nickel, is rectangular in outline and contains a circular aperture whose diameter is substantially greater than that of rectifier contact.

Semiconductive body 12 is held by means of its base tab 16, in a mechanical assembly 18 which is rotatable about its vertical axis and which affords separate electrical connections to the rectifier contact 14 and the base tab 16. More specifically the latter assembly, shown largely in cross-sectional view in the drawing, comprises a rectangular cup-shaped structure 20 whose respective inside dimensions correspond to and are only slightly larger than the outside dimensions of base tab 16. Affixed to the sides and base of the interior of structure 20 is a rubber gasket 22 which affords a water-tight seal for the interior of the cup when base tab 16 is abutted tightly against gasket 22.

To provide for the rotation of the semiconductive body, structure 20 is secured by screws 24 and 26 to a spindle 28 which is supported in a vertical position by means of a lateral bearing 30 and an end-thrust bearing 32 comprising a structure 34 which provides lateral support for spindle 28, and a ball bearing 36 contained within structure 34 and against which spindle 28 abuts. In addition, to enable rotational motion to be imparted to spindle 28, a spur gear 38 is fixedly secured thereto. Meshed with gear 38 is a driver gear 40 which is secured to a shaft 42, to which rotary motive power is imparted by a source (not shown).

To provide means for making electrical connection to the rectifier contact 14 of semicnductor structure 10, the apparatus also comprises a pointed metal element 44 attached to one end of a length of insulating tubing 46 which in one form may be composed of a plastic such as polystyrene. The latter tubing is slidably arranged within cylindrical cavities 48 and 50 respectively, bored coaxially within structure 20 and spindle 28. Moreover a helical compression spring 52 is contained within an additional cylindrical cavity 53 also bored coaxially within spindle 28 adjacent structure 20 and having a diameter substantially greater than that of the other cavities. The lower end of spring 52 is supported by the flange provided at the plane of contiguity of cavities 53 and 50, and the upper end thereof is staked to insulating tubing 46. The insulating tubing is arranged with respect to spring 52 so that when no semiconductive structure is mounted within structure 20, pointed metal element 44 extends a short distance beyond the plane defined by the top surface of gasket 22. Accordingly, when, as shown in the drawing, semiconductor assembly 10 is mounted within structure 20, pinted metal element 44 is depressed by rectifier contact 14 and hence is urged by spring 52 against the rectifier contact, thereby effecting a good electrical connection thereto.

To provide an accessible electrical connection to pointed metal element 44 and hence to rectifier contact 14, a slip ring assembly 54 is mounted upon spindle 28. This assembly comprises a ring of an insulating material 56 secured to spindle 28 and surmounted by a metal slip ring 58 secured thereto. Pointed element 44 is electrically connected to slip ring 58 by means of an insulated conductor 60 which is affixed to element 44, passes through tube 46 and a hole bored through the wall of spindle 28 and insulating ring 56 and is finally affixed to slip-ring 58. To connect slip-ring 58 to external electrical circuits described in detail hereinafter, a brush 62 is positioned abutting ring 58, while to provide a connection to semiconductive body 12 via the aforedescribed assembly, structure 34 is connected to a point at ground potential.

To achieve electrolytic etching of the surface of semiconductive body 12 opposing that to which rectifier contact 14 is applied, as well as to provide for measurement of the thickness of the region of semiconductive body 12 remaining between the rectifying barrier located within body 12 and its opposing surface, an electrochemical system is provided which includes a nozzle 64 oriented to direct a jet 66 of an electrically-conductive solution perpendicularly against semiconductive body 12. In the embodiment shown, nozzle 64 is supplied, by means of a pump 68, with an electrically-conductive solution 70 contained in a reservoir 72. The composition of solution 70 is discussed in greater detail hereinafter. However, it is here noted that in the preferred form now being described, in order to provide for plating of a surface-barrier contact upon the etched surface of body 12 during measuring intervals, as well as after body 12 has been excavated to the desired depth, the solution utilized is one which contains ions of the metal to be plated.

The electric currents utilized for etching, thickness measuring and subsequent plating are supplied to jet 66 by way of a timing circuit 74, a double-pole, double-throw switch 76, and an electrode 78 which is positioned within nozzle 64 and is composed of an inert metal, e.g. platinum. More specifically timing circuit 74 is constructed and arranged to provide, during a first group of periodically recurrent time-spaced intervals, an electric current having a sense producing etching of the semiconductive body; and, during a second group of periodically recurrent time-spaced intervals intermediate said first group, an electric current having a sense suitable for making the thickness measurement according to the invention. To achieve these objectives, timing circuit 74 comprises first, second and third sources of substantially constant direct voltage, which sources are respectively designated in the drawing as 80, 82 and 84. The timing circuit additionally includes a double-pole, double-throw electromagnetic relay 86 having a coil 88, first and second movable poles 90 and 92 respectively which are mechanically ganged, and four fixed contacts designated respectively as 94, 96, 98 and 100 which are disposed so that, when the coil 88 of relay 86 is unenergized, poles 90 and 92 are closed respectively to fixed contacts 94 and 98, whereas when coil 88 is energized, these poles are closed respectively to fixed contacts 96 and 100. Timing circuit 74 also comprises a timing network including a resistor 102 and a capacitor 104 connected serially and in the order named between movable pole 90 of relay 86 and one terminal 106 of relay coil 88. In addition the other terminal 108 of coil 88 is connected to the junction of resistor 102 and capacitor 104, so that capacitor 104 is connected in shunt with relay coil 88. Furthermore the negative terminals of voltage sources 80 and 84, and the positive terminal of voltage source 82, are all connected to a point at ground potential, whereas the positive terminals of sources 80 and 84 and the negative terminal of source 82 are connected respectively to fixed contacts 96, 100 and 98 of relay 86.

In addition, terminal 106 of coil 88 is connected to one pole 110 of double-pole, double-throw switch 76, which pole is closable to either fixed contact 112 or fixed contact 114 thereof, whereas the other pole 116 of switch 76, which is closable to either fixed contact 118 or fixed contact 120, is connected to electrolytic jet 66 via inert electrode 78. In addition, fixed contact 112 of switch 76 is connected directly to a point at reference potential, while fixed contact 118 of the switch is connected by way of a current-limiting resistor 122 to pole 92 of relay 86. The latter relay pole is also connected to fixed contact 120 of switch 76 by way of a second current-limiting resistor 124 and a rectifier 126, resistor 124 being connected between pole 92 and the anode 128 of rectifier 126, and the cathode 130 of rectifier 126 being connected directly to fixed contact 120.

To facilitate the electrolytic etching of semiconductive body 12, which, as specifically described, is composed of n-type material, the arrangement of Figure 1 employs a light source 132 which is diagrammatically represented as including an incandescent lamp 134 mounted within a cylindrical housing 136. As shown in the drawing, light source 132 is oriented so as to illuminate the body surface undergoing etching. However it will be understood that other methods for facilitating etching of body 12 may alternatively be employed. For example, etching may be enhanced by injecting holes into semiconductive body 12 during the etching step by applying a forward-biasing potential to rectifier contact 14. Because this method for facilitating etching is described and claimed in the co-pending patent application of G. K. Clymer and W. L. Doelp, Jr., Serial No. 545,013, filed November 4, 1955, entitled "Electrolytic Process," and assigned to the assignee of the present application, no further discussion thereof is deemed necessary herein.

Lastly, to provide during the etching process a visual display from which the contemporaneous thickness of the semiconductive body can be ascertained readily, there is employed a cathode-ray oscilloscope 138 having horizontal-deflection terminals 140 and 142 respectively and vertical-deflection terminals 144 and 146 respectively, as well as a sweep generator 148 having a positive-output terminal 150, a negative output terminal 152 and a trigger-signal input terminal 154. Sweep generator 148 is constructed and arranged to produce between output terminals 150 and 152, in response to a trigger pulse of positive polarity supplied to terminal 154, a voltage increasing linearly and within a predetermined time to a predetermined magnitude less than the punchthrough voltage for the thickness being measured, and then rapidly diminishing to a small value. Because suitable structures for oscilloscope 138 and sweep generator 148 are well-known to those skilled in the art, further description of details concerning the structures thereof is believed to be unnecessary herein.

To apply the triangular voltage wave, generated by sweep generator 148 in response to an appropriate trigger signal, between n-type semiconductive body 12 and rectifier contact 14 in a manner such that the rectifier contact is biased in the direction of difficult conduction, the positive-output terminal 150 of generator 148 is connected to a point at ground potential whereas the negative-output terminal 152 thereof is connected to rectifier contact 14 by way of a current-metering resistor 156, brush 62, slip-ring 58, conductor 60 and pointed metal element 44. Preferably, resistor 156, which is connected between terminal 152 and brush 62, has a value which is small compared to the back-biased resistance of rectifier contact 14.

To supply positively-poled trigger pulses to terminal 154 of sweep generator 148, thereby to activate the generator, there is provided a differentiating circuit comprising a capacitor 158 and a resistor 160 connected serially and in the order named between the cathode 130 of rectifier 126 and a point at ground potential. In addition, the junction 162 of resistor 160 and capacitor 158 is connected via a conductor 164 to terminal 154.

Lastly, to cause the cathode-ray beam of oscilloscope 138 to be deflected horizontally across the cathode-ray tube screen (diagrammatically indicated at 166) by an amount proportional to the instantaneous value of the back-biasing voltage applied between rectifier contact 14 and body 12 by sweep generator 148, horizontal deflection terminal 142 of oscilloscope 138 is connected to a point at ground potential, whereas horizontal-deflection terminal 140 is connected to brush 62. Furthermore, to cause the cathode-ray beam to be deflected vertically across screen 166 by an amount proportional to the intensity of the current flowing through the back-biased rectifier contact 14, vertical deflection terminals 144 and 146 are respectively connected to different terminals of current-metering resistor 156, which as aforementioned is connected in series relationship with rectifier contact 14.

In the operation of the above-described apparatus in accordance with the invention, jet electrolytic etching of semiconductive body 12, as well as contemporaneous measurement of the thickness of semiconductive material remaining between the etched surface of body 12 and the rectifying barrier located therewithin and to which rectifier contact 14 connects, is achieved. To condition the apparatus to produce these results, blades 110 and 116 of switch 76 are closed respectively to fixed contacts 112 and 118, in the manner shown in the drawing. In addition light source 132 is energized and its light is directed against that surface of semiconductive body 12 which is to undergo electrolytic etching. Furthermore, liquid pump 68 is set into operation and spindle 28 is energized, via gears 38 and 40, to rotate at a relatively rapid angular velocity about its vertical axis. Accordingly jet 66, composed of electrically conductive solution 70, is caused to issue from nozzle 64 and impinge against the surface of body 12. By means of the rapid rotation of body 12, the solution impinging thereon is caused to whirl outwardly from its point of impact across the impinged body surface in a very thin sheet. Although not essential to the practice of my invention, this rapid movement of the solution impinging the surface of the body helps to prevent the depletion of ions at the surface of the body which might occur if the solution were permitted to stagnate, and provides a uniform distribution of the solution over the surface, thereby to enhance the accuracy of the measurement.

Under all of the foregoing conditions, the following physical events occur. In timing circuit 74, at the time that blades 110 and 116 of switch 76 are respectively closed to fixed contacts 112 and 118, relay coil 88 is as yet unenergized and movable poles 90 and 92 of relay 86 are respectively closed to fixed contacts 96 and 100. Accordingly relay coil 88 is connected in series relationship with voltage-source 80 via pole 90, resistor 102, switch blade 110 and fixed contact 112, while inert electrode 78, positioned within nozzle 64, is connected via switch blade 116, fixed contact 118, resistor 122 and relay pole 92 to positive voltage source 84. Because capacitor 104 is shunted across relay coil 88, coil 88 is not immediately energized to that critical current intensity required to urge relay poles 90 and 92 into contact with fixed contacts 94 and 98 respectively. This occurs only after capacitor 104 has charged to a voltage whose value is sufficiently large to force a current having this critical intensity through coil 88. The time required for capacitor 104 to charge to this critical value is dependent in well-known manner on the values of resistor 102, capacitor 104, the resistance of coil 88 and the magnitude of the voltage supplied by source 80.

Upon elapsing of this time, movable poles 90 and 92 are urged by coil 88 out of connection with fixed contacts 96 and 100 respectively and into connection with fixed contacts 94 and 98 respectively. Accordingly relay coil 88 is disconnected from source 80, while inert electrode 78, located within nozzle 64, is connected via switch 76 and current-limiting resistor 122 to the negative pole of source 82. Because the electrolytic solution is thus established at a potential negative with respect to that of the semiconductive body, the semiconductive body undergoes electrolytic etching. This etching continues for that length of time required for the quantity of charge, initially stored within capacitor 104 and now flowing as an electric current through relay coil 88, to diminish to a value such that the voltage across capacitor 104 and coil 88 is insufficient to hold poles 90 and 92 closed against contacts 94 and 98. Again the duration of this interval of time may be predetermined readily.

When the voltage across capacitor 104 is no longer large enough to hold poles 90 and 92 against fixed contacts 94 and 98 respectively, these poles are thereupon urged by a relay spring (not shown) to close against contacts 96 and 100 respectively, and the aforedescribed timing cyle repeats itself. Moreover this closure now causes a positive voltage to be supplied to inert electrode 78 via current-limiting resistor 122. Because, as aforementioned, conductive solution 70 contains ions of a platable metal forming a rectifying contact, and because body 12 is now at a potential negative with respect to jet 66, a thin layer of this metal is quickly deposited on semiconductive body 12. In addition, because this deposited contact is forwardly-biased, it injects minority carriers, i.e. holes, into the semiconductive body. Furthermore, because resistor 122 has a value substantially larger than the sum of the resistances of this forwardly-biased rectifying contact and of the conduction path through body 12, the intensity of the current flowing through this rectifying junction, and hence the number of holes injected into body 12, is substantially constant despite the reduction in the body thickness produced by etching, and depends substantially only on the voltage supplied by source 84.

In addition the closure of pole 92 of relay 86 to fixed contact 84 thereof applies a positive voltage to the anode 128 of rectifier 126, thereby biasing it into its condition of high conductivity. Consequently a positive pulse is transmitted therethrough from source 84 to the differentiating circuit including capacitor 158 and resistor 160, and the resulting positive-going spike produced by the differentiating circuit in response to this pulse is applied to input terminal 154 of sweep generator 148. In response to this spike, sweep generator 148 produces, across output terminals 150 and 152 respectively, a linearly rising negative voltage which is applied via current-metering resistor 156 between semiconductive body 12 and rectifier contact 14. Preferably this voltage wave has a duration not exceeding the time interval during which timing circuit 74 supplies a positive voltage to jet 66. Because rectifier contact 14 is driven to a potential negative with respect to that of body 12, the latter contact is biased in the direction of difficult conduction, and accordingly is conditioned to collect that fraction of the holes then being injected by the electro-deposited rectifying contact which diffuse through body 12 into the vicinity of the rectifying barrier to which rectifier contact 14 affords connection. These collected carriers produce an output current which flows through current-metering resistor 156. Inasmuch as the number of minority carriers diffusing from the injecting barrier to the collecting barrier is strongly dependent upon the thickness of the semiconductive body region lying therebetween, the intensity of the output current flowing through current-metering resistor 156 provides a direct measure of the latter thickness.

Accordingly this output current may be supplied to metering devices to provide a visual indication of the progress of the etching and, as is discussed fully hereinafter, may also be used to provide a signal in response to which etching is terminated when the thickness of body 12 has been reduced to the desired value. Thus, in the arrangement of Figure 1, oscilloscope 138 provides a visual display from which the contemporaneous thickness of the semiconductive body region lying between the etched surface and a rectifying barrier located therewithin may be readily determined.

In this regard Figure 2 diagrammatically illustrates four curves such as might be displayed by oscilloscope 138 at differing times during the course of electrolytic etching. Specifically the axis of abscissas 200 of Figure 2 represents the magnitude of the back-biasing voltage applied between rectifier contact 14 and semiconductive body 12, while the axis of ordinates 202 represents the intensity of the current $I_c$ flowing through rectifier contact 14 in response to the constant-intensity current supplied to jet 66 and the voltage $V_c$ applied between contact 14 and body 12. In addition dotted curve 204 depicts the relationship between the current $I_c$ and the voltage $V_c$, which would be produced if no current were supplied to jet 66. The latter curve serves as a convenient reference level against which the curves now to be described may be compared.

The three other curves, designated as 206, 208 and 210 respectively in the graph of Figure 2, are representative of the curves displayed, in response to a current of positive sense supplied to jet 66 by timing circuit 74, at successively later times during the etching process, i.e. at times when body 12 has been etched successively thinner. Thus curve 206 represents a characteristic typically displayed on the screen 166 of oscilloscope 138 at the inception of electrolytic etching, i.e. when body 12 is relatively thick. Specifically, where body 12 is relatively thick, relatively few of the injected minority carriers are able to diffuse therethrough into the vicinity of the rectifying barrier to which rectifier contact 14 affords connection, and accordingly a relatively small current passes through contact 14 and current-metering resistor 156. Therefore a relatively small voltage is developed across resistor 156 to deflect the electron beam of the oscilloscope in a vertical direction.

As etching progresses, the rectifying barriers associated with jet 66 and rectifier contact 14 approach one another. Accordingly a substantially greater percentage of the minority carriers injected by the electrodeposited rectifier contact beneath jet 66 arrive by diffusion at, and are collected by, the rectifying barrier to which rectifier contact 14 connects. As a result the intensity of the current $I_c$ increases as the thickness of the semiconductive body decreases. Thus, at a time subsequent to that at which curve 206 is displayed, curve 208, indicative of a larger current flowing through contact 14 and resistor 156, may be observed. At a still later time, curve 210, indicative of a yet larger output current, may be observed. Because the intensity of the current $I_c$ is dependent at each instant on the thickness of the body region lying between the rectifying barrier to which contact 14 affords connection and the rectifying barrier established at the surface of body 12 impinged by jet 66, the screen 166 of oscilloscope 138 may be calibrated readily to be readable directly in terms of this thickness. Thus, as indicated in Figure 2, in such a calibration curve 206 would be representative of a thickness $W_1$, whereas curves 208 and 210 would be representative of successively smaller thickness $W_2$ and $W_3$.

In making the above-described measurement, it is preferable that light source 132 be extinguished, thereby to reduce the generation of minority carriers by sources other than the rectifying contact established between jet 66 and body 12. However I have found in practice that the measurement may be reproducibly made, for a given set of experimental conditions, even where light source 132 continues to illuminate body 12 during the measurement. Accordingly it is not essential that source 132 be extinguished.

When semiconductive body 12 has been excavated to the desired thickness, as indicated by the display on screen 166 of oscilloscope 138, this cyclic etching and measuring process may be terminated by disconnecting blades 110 and 116 of switch 76 from contacts 112 and 118 respectively. A surface-barrier electrode may then be plated onto the freshly etched region of body 12 by closing blades 110 and 116 of the switch to fixed contacts 114 and 120 respectively. Under these conditions a voltage positive with respect to that of body 12 applied to jet 66 from source 84, by way of current-limiting resistor 124, rectifier 126, fixed contact 120, blade 116 and inert electrode 78. Because semiconductive body 12 is thus biased negatively with respect to jet 66, body 12 acts as the cathode of an electrolytic plating process. Since solution 70 contains metal ions, this poling of the body-jet voltage causes the metal to be deposited on semiconductive body 12. In a typical case where the metal to be deposited is indium, solution 70 may contain:

Indium sulfate _____ grams__ 15.4
Ammonium chloride _____ do____ 11
d-Tartaric acid _____ do____ 1.5
Sodium salt of ethylene diamine tetra acetic acid
      grams__ 2
Water _____ liters__ 1

When this solution is utilized, the following additional process conditions have been found to produce smooth etching and adherent plating:

Diameter of jet 66 at orifice of nozzle 64
      inches__ 0.003
Pressure under which electrolyte is supplied to
   nozzle 64_____pounds per square inch__ 15
Temperature of solution 70_____° C__ 25
Intensity of etching current supplied to jet 66
      milliamperes__ 0.6 to 0.8
Intensity of plating current supplied to jet 66
      milliamperes__ 0.1

Additional details concerning jet-electrolytic etching are discussed in the above-identified Tiley-Williams, Noyce, Bradley-Roschen and Clymer-Doelp applications. Accordingly further discussion of the jet electrolytic process is believed to be unnecessary herein.

As aforementioned, applicant's novel method is particularly suitable for practice by automatic equipment constructed and arranged to mass-produce transistors and other semiconductive devices. In this regard reference is now made to Figure 3 of the drawings which illustrates an apparatus for performing applicant's novel process automatically. In Figure 3 only those portions of mechanical assembly 18 and nozzle 64 necessary to indicate the requisite electrical connection have been illustrated. However, it is to be understood that the rotating spindle arrangement of Figure 1, although not depicted in Figure 3, is preferably utilized in the latter arrangement and that elements of the apparatus of Figure 3 which are designated by the same numerals as elements in Figure 1 have structures substantially identical to those of the latter figure. In the arrangement of Figure 3 etching and thickness-measuring currents and voltages are supplied by sources of direct voltage 300 and 302 respectively as well as by a source of alternating current 304 coupled to the apparatus by a transformer 306 having a primary winding 308 and a secondary winding 310. In addition automatic control is provided by means of appropriately-connected relays 312 and 314 respectively.

More particularly relay 312 comprises a coil 316, a movable armature 318, a non-polarized fixed contact 320 and a fixed contact 322 polarized by a permanent magnet 324 positoned adjacent thereto, while relay 314 comprises a coil 326, an armature 328 and fixed contacts 330 and 332 respectively. Fixed contacts 320 and 322 of relay 312 are disposed so that, when coil 316 is unenergized, armature 318 is urged by a spring (not shown) against fixed contact 320, whereas when coil 316 is energized armature 318 is urged against contact 322 and until mechanically dislodged, is locked thereagainst by permanent magnet 324, even after coil 316 is de-energized. In relay 314, armature 328 is held against fixed contact 330 by a spring (not shown) while coil 326 is unenergized, and is urged against fixed contact 332 when coil 326 is energized.

As in the arrangement of Figure 1, to which reference is now made, semiconductive body 12 is connected to a point at ground potential via structure 20, spindle 28 and bearing 32. To supply appropriate etching and measuring currents to jet 66 via inert electrode 78, one terminal of secondary winding 310 of transformer 306 is connected to fixed contact 330 of relay 314 while the armature 328 of this relay is connected via a current-limiting resistor 334 to inert electrode 78. To complete this current-supplying circuit, and to cause the voltage applied between inert electrode 78 and body 12 to vary in a manner such that the intervals during which semiconductive body 12 is being etched are substantially longer than those during which its thickness is being measured, the positive terminal of direct-voltage source 300 is connected to a point at ground potential while its negative terminal is connected to the other terminal of secondary winding 310. Moreover, to supply a substantially constant back-biasing voltage to rectifier contact 14 as well as to provide for automatic termination of electrolytic etching of body 12 when the body has been excavated to the desired depth, the positive terminal of source 302 is connected to a point at reference potential and its negative terminal is connected to rectifier contact 14 via relay coil 316 and pointed metal element 44. In addition, to prevent relay chatter during the operation of the system, a bypass capacitor 336 is connected in shunt with relay coil 316 while, to provide means for selecting from a range of thicknesses the thickness at which etching is automatically terminated, a variable resistor 338 is also connected in shunt with coil 316. In addition armature 318 of relay 312 is connected to a point at reference potential, one terminal of relay coil 326 of relay 314 is supplied with a positive potential from a source 340 connecting this terminal to a point at reference potential, and the other terminal of coil 326 is connected to fixed contact 322 of relay 312.

In operation jet 66 is supplied by alternating voltage source 304 and direct voltage source 300, via contact 330, armature 328, current-limiting resistor 334 and inert electrode 78, with a potential which is negative with respect to body 12 during each of a first group of periodically recurring, time-spaced intervals, and is positive with respect to body 12 during each of a second group of periodically recurring, time-spaced intervals intermediate those of the first group. Accordingly, during each of the intervals of the first group, body 12 undergoes electrolytic etching, whereas during each of the intervals of the second group, minority carriers are injected into semiconductive body 12 by the rectifying barrier formed beneath the metal electrodeposited on the surface of body 12 by jet 66. As discussed hereinbefore, these injected minority carriers diffuse through body 12 toward the rectifying barrier to which rectifier contact 14 affords connection, the number of carriers actually reaching the latter barrier depending upon the thickness of body 12. Those arriving at this barrier, which in accordance with the invention is back-biased by voltage source 302, are collected thereby and flow as an output current through rectifier contact 14. Because the holes are injected into body 12 at time-spaced intervals, the output current has a pulsatile form and accordingly comprises a direct component and harmonically related alternating components. Many of the higher frequency alternating components of this pulsatile current are bypassed via capacitor 336 and source 302 to a point at reference potential, whereas the direct and lower frequency components thereof are current-divided between shunt-connected relay coil 316 and resistor 338, in accordance with their respective impedances. When as a result of the thinning of body 12 by electrolytic etching, the value of this pulsatile hole current has increased to a predetermined critical intensity, coil 316 of relay 312 closes its armature 318 to fixed contact 322. This closure in turn causes coil 326 of relay 314 to be energized by source 340, thereby causing armature 328 thereof to be urged out of connection with contact 330 and accordingly opening the circuit supplying etching and measuring potentials to jet 66. Because fixed contact 322 of relay 312 is magnetically polarized, armature 318 is locked into contact therewith until mechanically dislodged therefrom.

To vary the thickness at which the process terminates, it is only necessary to change the value of variable resistor 338, thereby changing the proportion of hole current flowing through relay coil 316 and hence varying the total amount of hole current which must flow through rectifier contact 14 in order that coil 316 be energized sufficiently to draw armature 318 over to contact 322. As in the preceding embodiment, a source of illumination (not shown) is directed toward the surface of semiconductive body 12 to be etched.

While the apparatus described above in each instance has included an assembly for rapidly rotating the semiconductive body beneath the jet, as well as a gasket for isolating from the solution the body surface to which the rectifier contact is applied, it is by no means essential that this specific arrangement be used. For example, equally practicable alternative arrangements for protecting the surface bearing the rectifier contact from wetting are those illustrated by L. W. Hershinger in two copending patent applications, i.e. Serial No. 550,722, now abandoned, filed December 2, 1955, entitled "Method of and Apparatus for Etching," and Serial No. 608,761, filed September 10, 1956, as a continuation-in-part of the first-named application and entitled "Method of and Apparatus for the Application of Liquids to Solids," both of which applications are assigned to the assignee of the present application. In these applications, Hershinger describes and claims a nozzle constructed and arranged to wet only a specified area of a body surface positioned adjacent its orifice. When such a nozzle is used it then becomes unnecessary to provide either rotary motion to spread the electrolyte evenly over the wet surface, or barriers to liquids such as gasket 22 to prevent the electrically-conductive solution from wetting the opposing surface of the semiconductive body.

In addition it is clear that the semiconductive body to be etched may be a p-type as well as an n-type body. In this regard, since illumination does not facilitate appreciably the etching of p-type bodies, there is no need to illuminate their surfaces. Furthermore although in the two embodiments specifically discussed hereinbefore, the rectifier contact used to collect minority carriers is a metallic contact, this is by no means essential to the practice of the invention. For example, a liquid rectifier contact, confined to the surface of the semiconductive body opposing the one to which the etching jet is applied, may also be used, and in fact may be arranged to provide simultaneous etching of the semiconductive surface. The Hershinger jets mentioned above are particularly useful in this application.

Moreover where, as in the embodiment of Figure 3, only etching and measuring are to be achieved, the electrically-conductive solution utilized therein need not contain ions of a metal to be plated.

In addition, while in the embodiments discussed, the alternating etching and measuring steps of my method have been automatically timed by utilizing, in the arrangement of Figure 1, a timing circuit and, in the arrangement of Figure 2, appropriately interconnected sources of alternating and direct voltages, it will be clear to those skilled in the art that these steps of my method can also be accomplished merely by the manual throwing of an appropriately connected switch. For example, in the arrangement of Figure 1, double-pole, double-throw relay 86 can be replaced by a double-pole, double-throw, manually actuatable switch which then can be actuated at the will of an operator to either the "etch" or "measure" position.

Thus while I have described my invention by means of specific examples and in specific embodiments, I do not wish to be limited thereto, for obvious modifications will occur to those skilled in the art without departing from the scope of my invention.

What I claim is:

1. In a method for producing a region of particular thickness in an n-type semiconductive body having a rectifying barrier therein, the steps of: applying to an exposed surface of said body opposing said barrier an electrically-conductive solution containing ions of a metal forming a surface-barrier when applied to said body; supplying to said solution during a first group of time-spaced intervals a first input current having a sense such as to establish said solution at a potential negative with respect to that of said body, thereby to produce electrolytic etching of said body; supplying to said solution during a second group of time-spaced intervals intermediate said first group a second input current having a particular intensity and a sense opposite said first-named sense, thereby to cause said metal to be electrodeposited on said opposing surface and said electrodeposited metal to inject holes into said semiconductive body; applying to said rectifying barrier at least during said intervals of said second group a potential negative with respect to that of said body and having a magnitude less than that producing an abrupt decrease in the impedance between said two rectifying contacts when said region has said particular thickness, thereby to collect those of said injected holes diffusing into the vicinity of said first rectifying barrier; and detecting the proportion of said injected holes collected at said rectifying barrier by sensing the intensity of the current flowing therethrough, thereby to obtain an indication of the thickness of said body region.

2. A method according to claim 1, said method including the additonal step of terminating the supply of said first and second input currents when said intensity of said sensed current attains the value corresponding to said particular thickness.

3. A method according to claim 1, wherein said sensing step includes the step of supplying said current flowing through said rectifying barrier to a metering device, thereby to provide a visible indication of the contemporaneous thickness of said region.

4. In a method for producing a region of particular thickness in an n-type semiconductive body having a rectifier electrode applied to one surface thereof, the steps of directing against an exposed surface of said body opposing said one surface a jet of an electrically-conductive solution containing ions of a metal forming a surface barrier when applied to said body; isolating said one surface from contact with said electrically-conductive solution; during a first group of time-spaced intervals supplying to said jet a first input current having a sense such as to establish said jet at a potential negative with respect to that of said body and irradiating said exposed surface with light, thereby to etch said exposed surface; during a second group of time-spaced intervals intermediate said first group supplying to said jet a second input current having a predetermined intensity and a sense opposite said first-named sense, thereby to cause said metal to electrodeposit on said exposed surface and said electrodeposited metal to inject holes into said semiconductive body; applying to said rectifier electrode a potential negative with respect to that of said semiconductive body and having a magnitude less than that producing an abrupt decrease in the impedance between said rectifier electrode and said jet when said region has said particular thickness, thereby to collect those of said injected minority carriers diffusing into the vicinity of said rectifier electrode; and detecting the proportion of said injected holes collected at said rectifier electrode by sensing the intensity of the current flowing therethrough, thereby to obtain an indication of said thickness of said body region.

5. A method according to claim 4, said method including the additional step of rapidly rotating said semiconductive body about an axis substantially normal to said exposed surface and parallel to said jet.

6. A method according to claim 4, wherein said semiconductive body is composed of n-type germanium.

7. A method according to claim 4, said method including the additional step of terminating the supply of said first and second input currents when said intensity of said sensed current attains the value corresponding to said particular thickness.

References Cited in the file of this patent
UNITED STATES PATENTS

| | | |
|---|---|---|
| 1,882,962 | Sawford | Oct. 18, 1932 |
| 2,644,852 | Dunlap | July 7, 1953 |
| 2,746,918 | Whittington | May 22, 1956 |
| 2,846,346 | Bradley | Aug. 5, 1958 |
| 2,875,140 | Sikna | Feb. 24, 1959 |
| 2,875,141 | Noyce | Feb. 24, 1959 |